US005587644A

United States Patent [19]

Masaki

[11] Patent Number: 5,587,644

[45] Date of Patent: Dec. 24, 1996

[54] CHARGING CONTROL DEVICE FOR FLASH DEVICE

[75] Inventor: Junya Masaki, Kanagawa-ken, Japan

[73] Assignee: Canon Kabushiki Kaisha, Tokyo, Japan

[21] Appl. No.: 490,000

[22] Filed: Jun. 12, 1995

[30] Foreign Application Priority Data

Jun. 15, 1994 [JP] Japan .................................... 6-133265

[51] Int. Cl.[6] ............................ H02J 7/00; H01M 10/44; G03B 7/00; G03B 7/08

[52] U.S. Cl. ............................... 320/1; 396/205; 396/159

[58] Field of Search .......................... 320/1, 35; 354/416, 354/418, 428

[56] References Cited

U.S. PATENT DOCUMENTS

| | | | |
|---|---|---|---|
| 3,688,659 | 9/1972 | Takishima et al. | 354/127.12 |
| 4,501,481 | 2/1985 | Kataoka et al. | 354/418 X |
| 5,016,038 | 5/1991 | Kobayashi et al. | 354/418 |
| 5,056,232 | 11/1991 | Kondo | 354/430 |
| 5,204,611 | 4/1993 | Nor et al. | 320/35 X |
| 5,257,063 | 10/1993 | Ishimaru et al. | 354/416 |
| 5,371,453 | 12/1994 | Fernandez | 320/35 X |
| 5,374,886 | 12/1994 | Kohl et al. | 320/35 X |
| 5,391,974 | 2/1995 | Shiojima et al. | 320/35 |
| 5,451,857 | 9/1995 | Moe | 320/35 |

*Primary Examiner*—Peter S. Wong
*Assistant Examiner*—K. Shin
*Attorney, Agent, or Firm*—Robin, Blecker, Daley & Driscoll

[57] ABSTRACT

A charging control device for a flash device is arranged to detect ambient temperature in controlling a flash device charging voltage and to perform the charging control up to a level corresponding to the temperature detected, so that the flash device can be allowed to flash at a constant guide number irrespective of any changes in temperature.

5 Claims, 8 Drawing Sheets

| | | TEMPERATURE | | | | | |
|---|---|---|---|---|---|---|---|
| | | -20°C | -10°C | 0°C | +10°C | +25°C | +45°C |
| CAPACITY OF MAIN CAPACITOR | (3) | 0B | 09 | 07 | 05 | 03 | 01 |
| | (5) | 0C | 0A | 08 | 06 | 04 | 02 |
| | (1) | 0D | 0B | 09 | 07 | 05 | 03 |
| | (4) | 0E | 0C | 0A | 08 | 06 | 04 |
| | (2) | 0F | 0D | 0B | 09 | 07 | 05 |

CHARGING CONTROL DEVICE FOR FLASH DEVICE

BACKGROUND OF THE INVENTION

1. Field of the Invention

This invention relates to a flash photography system for a camera and more particularly to a flash photography system arranged to have the charging voltage of a main capacitor of a flash device automatically controlled according to a guide number in carrying out flash photography.

2. Description of the Related Art

The conventional flash photography system has been arranged to detect the charging voltage level of a main capacitor connected to the flash bulb of a flash device only at a predetermined level and to charge the main capacitor to bring its voltage up to the predetermined level if the level detected is found to be lower than the predetermined level.

Meanwhile, it is known that some of the recent lens-shutter type cameras having the above-stated flash photography system are arranged to automatically correct an aperture value according to a guide number obtained by the flash device of each individual camera, as long as the photo-taking optical system is within an aperture adjustable range in carrying out flash photography.

However, the above-stated known camera and the flash photography system have the following shortcomings.

(i) The electrostatic capacity of the main capacitor of one manufactured flash device differs from that of another, because of a manufacturing tolerance. The guide number of each individual flash device thus differs from that of another in proportion to the square root of the ratio of electrostatic capacity. If different flash devices are mounted on cameras of the same kind, therefore, the guide number of the flash device of one camera differs from that of another as much as a value which is proportional to the square root of the ratio of electrostatic capacity of the main capacitor. However, in the case of the above-stated known lens-shutter type camera, an exposure is decided according to the F-number of the photo-taking optical system and the guide number of the flash device (without correcting the aperture value) if the luminance of the object obtained by light measurement is outside of an aperture adjustable range in the mode of flash photography. Hence, in this instance, an illuminating condition set for one camera becomes different from a condition set for another camera even under the same shooting (photographing) conditions.

(ii) Since the electrostatic capacity of the main capacitor of the flash device varies with changes taking place in ambient temperature, the guide number of the flash device also varies with the ambient temperature. This fact further causes the flash photographing performance of one camera to become different from that of another in addition to the problem mentioned in (i) above.

SUMMARY OF THE INVENTION

It is one aspect of the invention under the present application to provide a flash device charging control device which is provided with a sensor circuit for detecting ambient temperature and is arranged to find a charging voltage required for making a guide number of the flash device unvarying, on the basis of the ambient temperature detected, and to regulate a charging action so as to attain the charging voltage found.

It is another aspect of the invention to provide a flash photography system which is provided with detecting means for detecting a charging voltage of a main capacitor, an A/D conversion circuit for A/D (analog-to-digital) converting the charging voltage detected into a digital value and a memory circuit in which data for a charging voltage is stored. The system is arranged to compare the data stored in the memory circuit with the digital value of the charging voltage obtained by the A/D conversion circuit and to regulate a charging action on the main capacitor.

It is a further aspect of the invention to provide a flash photography system which is arranged to set charging data according to a reference guide number (hereinafter will be referred to as GNo.) in an EEPROM (electrically erasable programmable read-only memory), to charge a main capacitor of a flash device with electric energy up to a level corresponding to the set charging data, to measure a GNo. obtained when the flash device is caused to flash under such condition, and then to set new charging data in the EEPROM according to a difference between the measured GNo. and the reference GNo., so that the charging data which is to be used for regulating the charging action can be appositely set.

The above and other aspects and features of the invention will become apparent from the following detailed description of embodiments thereof taken in conjunction with the accompanying drawings.

DETAILED DESCRIPTION OF THE PREFERRED EMBODIMENTS

Some of embodiments of the invention are described below with reference to the drawings.

Figure 1:
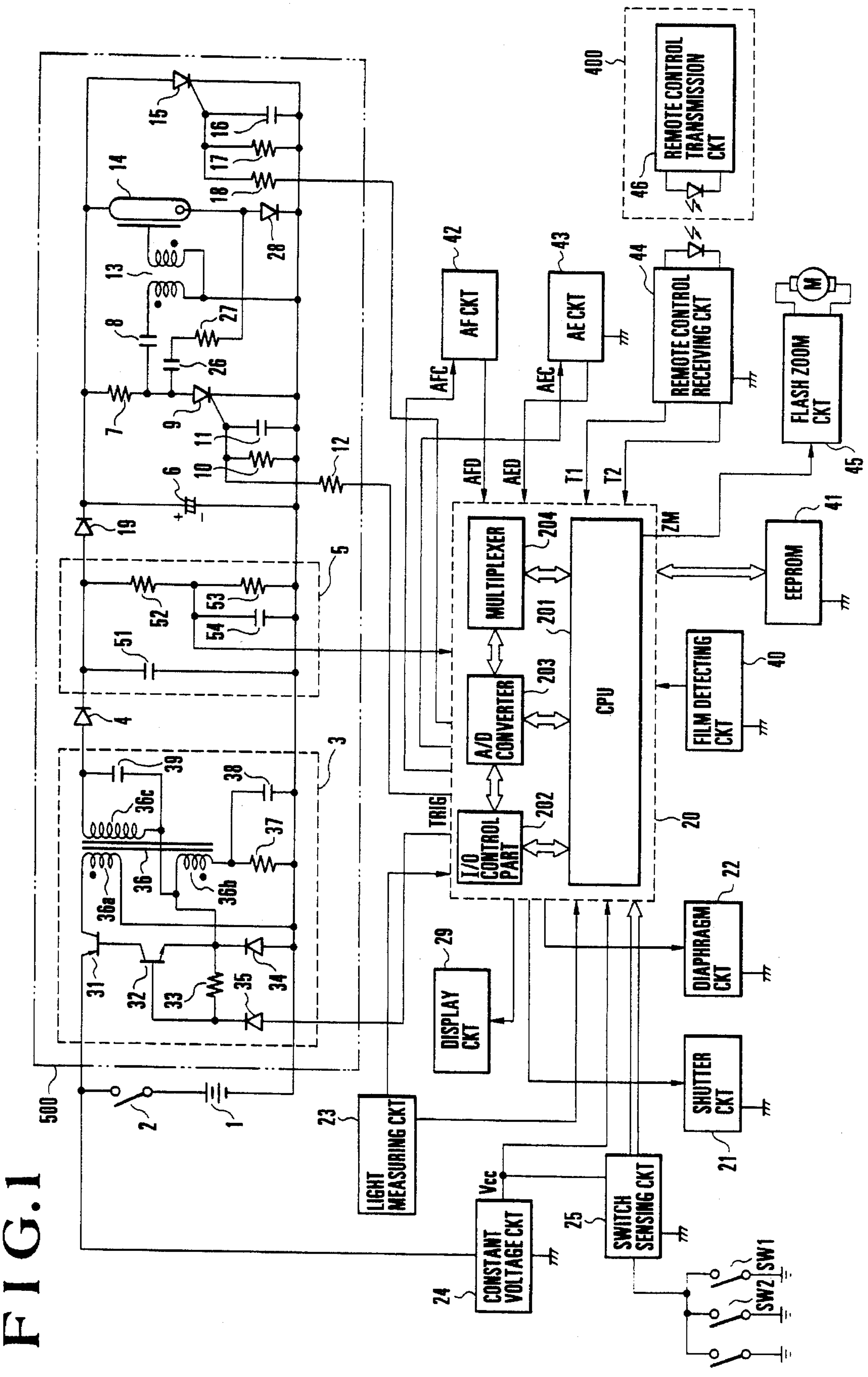
FIG. 1 schematically shows the electrical arrangement of a camera having a flash photography system arranged as a first embodiment of the invention.

FIG. 1 shows in outline a flash photography system arranged as a first embodiment of the invention.

Referring to FIG. 1, a flash circuit 500 which is encompassed with a two-dot-chain line is arranged to control the flashing action of a flash device, which is either mounted on the outside of the camera or disposed inside of the camera body. A remote control device 400 which is encompassed with a one-dot-chain line is removably mounted on the camera. Other circuit parts in FIG. 1 are all disposed inside of the camera body.

A battery 1 is disposed within the camera body. A power supply switch 2 is arranged on the camera body in a known manner. A step-up charging control circuit 3 is arranged to charge a main capacitor 6 which will be described later. A diode 4 is provided for rectification. A voltage detecting circuit 5 is arranged to detect the charging voltage of the main capacitor 6. The main capacitor 6 is arranged to supply a flash bulb (xenon discharge lamp) 14 with light emitting energy. A triggering thyristor 9 is arranged to trigger the flash bulb 14. A thyristor 15 is arranged to stop the flash bulb 14 from flashing (emitting light).

The step-up charging control circuit 3 is arranged to charge the main capacitor 6 by boosting the output voltage of the battery 1 of 6 to 12 volts up to a maximum voltage of about 300 volts. The step-up charging control circuit 3 consists of a step-up transformer 36 and a control means for controlling a current which flows to the primary side of the step-up transformer 36. The control means is provided with a PNP power transistor 31 for controlling the current flowing to the primary side of the transformer 36 and an NPN transistor 32 for controlling the transistor 31.

The step-up transformer 36 consists of a primary winding **36*a* which has one end connected to the collector of the transistor 31, a feedback winding 36*b* which is wound on the primary side in the direction opposite to the primary winding 36*a* and is connected to a secondary winding 36*c* and between one pole of a capacitor 39 and the emitter of the transistor 32 through its one terminal. The other terminal of the feedback winding 36*b* is connected to a grounding line through a parallel circuit of a resistor 37 and a capacitor 38. Further, one of the poles of the capacitor 39 which is connected in parallel to the secondary winding 36*c* is connected to the anode of the rectifying diode 4. The other pole of the capacitor 39 is connected to one end of the feedback winding 36*b*. In other words, the terminal voltage on the side of the secondary winding 36*c* is arranged to be fed back to the feedback winding 36*b* in such a way as to vary the magnetomotive force of the primary winding 36*a***.

Further, the terminal voltage of the capacitor 39 is arranged to be fed back to the emitter of the transistor 32 to vary the voltage of the emitter. The resistor 33 which is connected between the base and the emitter of the transistor 32 is arranged to vary the base driving voltage of the transistor 32 by bringing about a voltage drop between the base and the emitter of the transistor 32 on the basis of a difference between the emitter voltage which is increased or decreased by the output voltage of the transformer 36 and the base voltage (i.e., a control signal inputted from a microcomputer 20). A reverse-current preventing diode 34 is arranged to keep the emitter voltage of the transistor 32 lower than ground voltage. A diode 35 is arranged to prevent a feedback signal from mixing into a control signal applied to the base of the transistor 32 from the microcomputer 20. A reference numeral 38 denotes a capacitor which is provided for preventing a direct current. The resistor 37 is provided for biasing a direct current.

The voltage detecting circuit 5 is arranged to detect the voltage of the main capacitor 6 in a known manner. The voltage detecting circuit 5 consists of a direct current preventing capacitor 51 which is connected between the cathode of the rectifying diode 4 and a grounding line and a voltage dividing circuit which is connected in parallel to the capacitor 51 and the main capacitor 6. A voltage obtained at a point between two series resistors 52 and 53 which form the voltage dividing circuit is arranged to be taken into the microcomputer 20. A filtering capacitor 54 is arranged to prevent a noise from entering into an output signal.

A reverse-current preventing diode 19 is arranged to prevent a reverse flow of current to the power supply side of the electric charge obtained in the main capacitor 6. A resistor 7 is arranged to determine the potential of the triggering capacitor 8 of the flash bulb 14, the potential of the capacitor 26 and the anode potential of the thyristor 9. A high voltage pulse transformer 13 is arranged to apply a high voltage trigger pulse to the flash bulb 14. A trigger pulse generating capacitor 8 is arranged to generate a trigger pulse at the pulse transformer 13. A diode 28 is connected between the cathode of the flash bulb 14 and the grounding line. A double voltage circuit which consists of a capacitor 26 and a resistor 27 is connected between the anode of the diode 28 and that of the thyristor 9. The double voltage circuit is arranged to cause a large current to flow to the flash bulb 14 by applying a large negative pulse trigger to the anode of the diode 28 when the thyristor 9 is in an on-state. Current limiting resistors 12 and 18 are arranged to determine the voltage of gate trigger pulses applied from the microcomputer 20 to the gates of thyristors 9 and 15. Capacitors 11 and 16 and resistors 10 and 17 respectively form noise mixing preventing means for preventing noises from mixing in the gate trigger signals applied to the thyristors 9 and 15.

The outline of the arrangement of the flash circuit 500 is as described above. The component elements of the flash circuit 500 do not have to be disposed within the flash device. They may be disposed on the side of the camera body in some cases, as will be described later herein. Circuits disposed in the camera body and a lens barrel (in the case of a single-lens reflex camera) are next described in outline as follows.

The microcomputer 20 which is disposed within the camera body is provided with an input/output control part 202 (hereinafter referred to as I/O control), an A/D converter 203, a multiplexer 204 and a microprocessor (CPU) 201 and is arranged to be driven by the output voltage Vcc (5 volts) of a constant voltage circuit 24.

To the I/O control 202 are connected input and output terminals of varied kinds of the flash circuit 500 and also those of circuits of varied kinds which will be described later. Control signals to be used for control over these circuits are generated and outputted from the I/O control 202. Signals outputted from these circuits are taken into the I/O control 202. The A/D converter 203 is arranged to convert each analog signal taken in by the I/O control 202 into a digital signal and to supply the digital signal to the CPU 201. The multiplexer 204 is arranged to perform various actions including selecting and comparing actions on various signals.

The constant voltage circuit 24 is arranged in a known manner to receive an energy supply from the battery 1 and includes among others a DC-DC converter which generates an output voltage of 5 volts. The constant voltage circuit 24 is thus arranged to supply power not only to the microcomputer 20 but also to all other low current demand circuits. A light measuring circuit 23 is arranged to control a light measuring device mounted on the camera body. A switch sensing circuit 25 is arranged to detect the states of various switches, such as the switches SW1 and SW2 which act in association with an operation on a release switch, etc. A display circuit 29 is arranged to control a display device disposed on the camera body. A shutter circuit 21 is arranged to control a shutter device of the camera. A diaphragm circuit 22 is arranged to control a diaphragm device disposed inside of the lens barrel. A film detecting circuit 40 is arranged to find whether or not the camera is loaded with a film. An AF circuit 42 is arranged to cause a distance measuring device disposed on the camera to measure a distance to an object of shooting and to control the movement of a focusing lens of the photo-taking optical system on the basis of the result of the distance measurement. An AE circuit 43 is arranged to perform exposure control (AE) to decide an exposure of the photo-taking optical system on the basis of the result of light measurement performed by the light measuring device. There is provided a remote control receiving circuit 44 which is arranged to receive a remote control signal sent from a remote control transmission circuit 46 disposed within the remote control device 400. A flash zoom circuit 45 is arranged to control the flash device mounted on the camera body or a zooming device of the flash device, if the flash device is arranged to have a zoom function.

A storage device 41 is composed of an EEPROM (electrically erasable programmable read-only memory). The storage device 41 is disposed on the same circuit board as the microcomputer 20 and is connected via a data bus to the CPU 201 along with the multiplexer 204 and the A/D converter 203. In the case of the camera according to the invention, data indicative of the relative correspondence between the guide number (hereinafter will be referred to as GNo.) and the charging voltage of the main capacitor 6 of each individual product of the flash device is written into the storage device 41 before shipment from a factory where the camera is manufactured.

In the case of the flash photography system of this embodiment, a voltage detection signal taken in the I/O control 202 of the microcomputer 20 from the charging voltage detecting circuit 5 is converted into a digital value by the A/D converter 203. The digital value of the detected voltage is compared at the multiplexer 204 with the above-stated data stored beforehand in the storage device 41 (data indicative of the correlation between the GNo. and the charging voltage of the main capacitor 6 of the individual flash device; a voltage value which is, for example, data obtained by actual measurement and gives a predetermined GNo. is stored). After the comparison, a charging action on the main capacitor 6 is controlled by varying a voltage step-up control signal applied to the transistor 32 of the step-up charging control circuit 3 according to the amount of shortage of the charging voltage of the main capacitor 6 found by the comparison.

Next, the operation of the flash photography system of this embodiment which is arranged as described above is briefly described as follows.

When the user of the camera turns the power supply switch 2 on, the battery 1 is connected to the constant voltage circuit 24 and the step-up charging control circuit 3. As a result, the constant voltage circuit 24 acts to supply a constant voltage Vcc to the microcomputer 20 and also to other various circuits. Meanwhile, the positive electrode of the battery 1 is connected to the emitter of the transistor 31 disposed within the step-up charging control circuit 3 to connect the battery 1 to the step-up charging control circuit 3.

When a release button which is not shown is pushed halfway (as a first operation) by the user for shooting, the switch SW1 turns on. The switch sensing circuit 25 then supplies the microcomputer 20 with a signal indicating that the switch SW1 has turned on. The microcomputer 20 sends signals to the AE circuit 43 and the AF circuit 42 according to the input signal to cause them to measure the luminance and distance of the object of shooting. The results of the light and distance measuring actions are taken in. A lens driving amount required for obtaining an in-focus state and an exposure amount, i.e., a diaphragm opening amount and a shutter opening amount, are computed accordingly. Then, whether it is necessary or not necessary to cause the flash device to flash is decided. The focusing lens is driven as necessary through the AF circuit 42 and the diaphragm aperture is adjusted through the diaphragm circuit 22 according to the result of computation. If flashing is decided to be necessary, the charged state of the main capacitor 6 is examined by taking in a voltage detection value of the voltage dividing circuit (resistors 52 and 53) of the voltage detecting circuit 5 which is disposed within the flash circuit 500. In the case of the camera according to the invention, the voltage detection signal from the voltage detection circuit 5 is sent to the microcomputer 20 and is inputted to the A/D converter 203 to be converted into a digital value. The digital value is inputted to the multiplexer 204. At the multiplexer 204, the detected voltage value is compared with the stored data which is read out from the EEPROM 41 and indicates the correlation of the GNo. of the flash device and the charging voltage for the main capacitor 6. If the voltage of the main capacitor 6 is found through the comparison to be lower than a necessary voltage, a driving signal is inputted to the base of the transistor 32 from the I/O control 202 via the diode 35 to turn on the transistor 32 for charging the main capacitor 6 up to the necessary level of voltage. When the transistor 32 is thus turned on, the emitter and the collector of the transistor 32 become conductive with each other to lower the collector voltage. As a result, the base potential of the PNP transistor 31 drops to turn on the transistor 31. The emitter and the collector of the transistor 31 become conductive with each other to allow a current from the battery 1 to flow into the primary winding **36*a* of the transformer 36. Therefore, an AC voltage is induced at the secondary winding 36*c* of the transformer 36 and an alternating current is generated there. The alternating current flows into the capacitor 39 and the diode 4. The diode 4 rectifies the alternating current into a half-wave pulsation flow. The main capacitor 6 is then gradually charged through the reverse-current preventing diode 19** in the polarity indicated in the drawing.

The alternating current which flows into the capacitor 39 comes to flow to the feedback winding **36*b* and the capacitor 38 before it flows to the grounding line. Then, at the feedback winding 36*b*, there is generated a terminal voltage of the capacitor 39, i.e., a reverse magnetomotive force which is proportional to the magnitude of the current (a magnetomotive force in the direction opposite to the magnetomotive force of the primary winding 36*a*). As a result, therefore, a dielectric voltage which is in proportion to a difference between the magnetomotive force of the primary winding 36*a* and that of the feedback winding 36*b* is generated at the secondary winding 36*c***.

The terminal voltage of the capacitor 39, i.e., the terminal voltage of the feedback winding **36*b*, is applied also to the emitter of the transistor 32. The emitter voltage of the transistor 32, therefore, varies according to the voltage on the secondary side of the transformer 36. Hence, the base driving voltage is changed by a drop in voltage due to the resistor 33 which is connected between the base and the emitter of the transistor 32. The driving voltage of the transistor 32 is thus controlled according to the output voltage obtained from on the secondary side of the transformer 36**.

During the process of charging the main capacitor 6 in this manner, the microcomputer 20 takes in a signal outputted from the voltage detecting circuit 5 and continuously monitors changes taking place in the terminal voltage of the capacitor 6 in the form of digital values. When the terminal voltage of the capacitor 6 reaches a desired value, the driving signal which has been applied to the base of the transistor 32 of the step-up charging control circuit 3 is discontinued. Then, to cause the display device to display that a flashing action has become possible, a signal is supplied to the display circuit 29.

After completion of the process of charging the main capacitor 6, the camera waits until the release button which is not shown is fully pushed. When the switch SW2 which is responsive to a full pushing operation on the release button turns on with a second stroke of operation effected on the release button, the switch sensing circuit 25 detects the turning-on of the switch SW2 and inputs a signal to the microcomputer 20. In response to the input signal, the microcomputer 20 causes the thyristor 9 to turn on by applying a trigger pulse from the I/O control 202 to the gate of the thyristor 9. With the thyristor 9 turned on, electric charge accumulated in the flash bulb triggering capacitor 8 is discharged through the anode of the thyristor 9. As a result, a high voltage pulse is induced on the secondary side of the high voltage pulse transformer 13 and a trigger is applied to the flash bulb 14. At the same time, the electric charge of the capacitor 26 of the double-voltage circuit is discharged also through the thyristor 9. Therefore, a large negative voltage arises at the cathode of the flash bulb 14. A large potential difference arises between the anode and the cathode of the flash bulb 14. When electric discharge is caused to begin at the flash bulb 14 by the trigger applied from the pulse transformer 13, the potential difference causes the discharge to become large in a moment. An electric current brought about by this discharge flows to the grounding line through the diode 28. A light flux generated by the flash bulb 14 is then projected toward the object of shooting. Then, at the same time, a shutter device which is not shown is caused to be driven through the shutter circuit 21 by a control signal from the microcomputer 20 to carry out an exposure action on a film surface for a predetermined period of time.

In a case where the flash device is a zoom type flash device, a zooming action of the flash device is caused to be performed with the flash zoom circuit 45 driven by a control signal supplied from the microcomputer 20 prior to the flashing action.

The instant the shutter driving process comes to an end, a gate trigger pulse is applied from the I/O control 202 of the microcomputer 20 to the gate of the thyristor 15. The thyristor 15 then turns on. A current then flows from the anode of the thyristor 15 to its cathode to cause the anode potential of the flash bulb 14 to drop. Then, a reverse bias is applied to the cathode of the diode 28 and the cathode of the thyristor 9. As a result, the discharge of the flash bulb 14 comes to a stop and the thyristor 9 turns off.

Next, the control operation to be performed within the microcomputer 20 at the time of shooting and the functions of the camera of this embodiment are described with reference to FIGS. 2 to 4 as follows.

Figure 2:
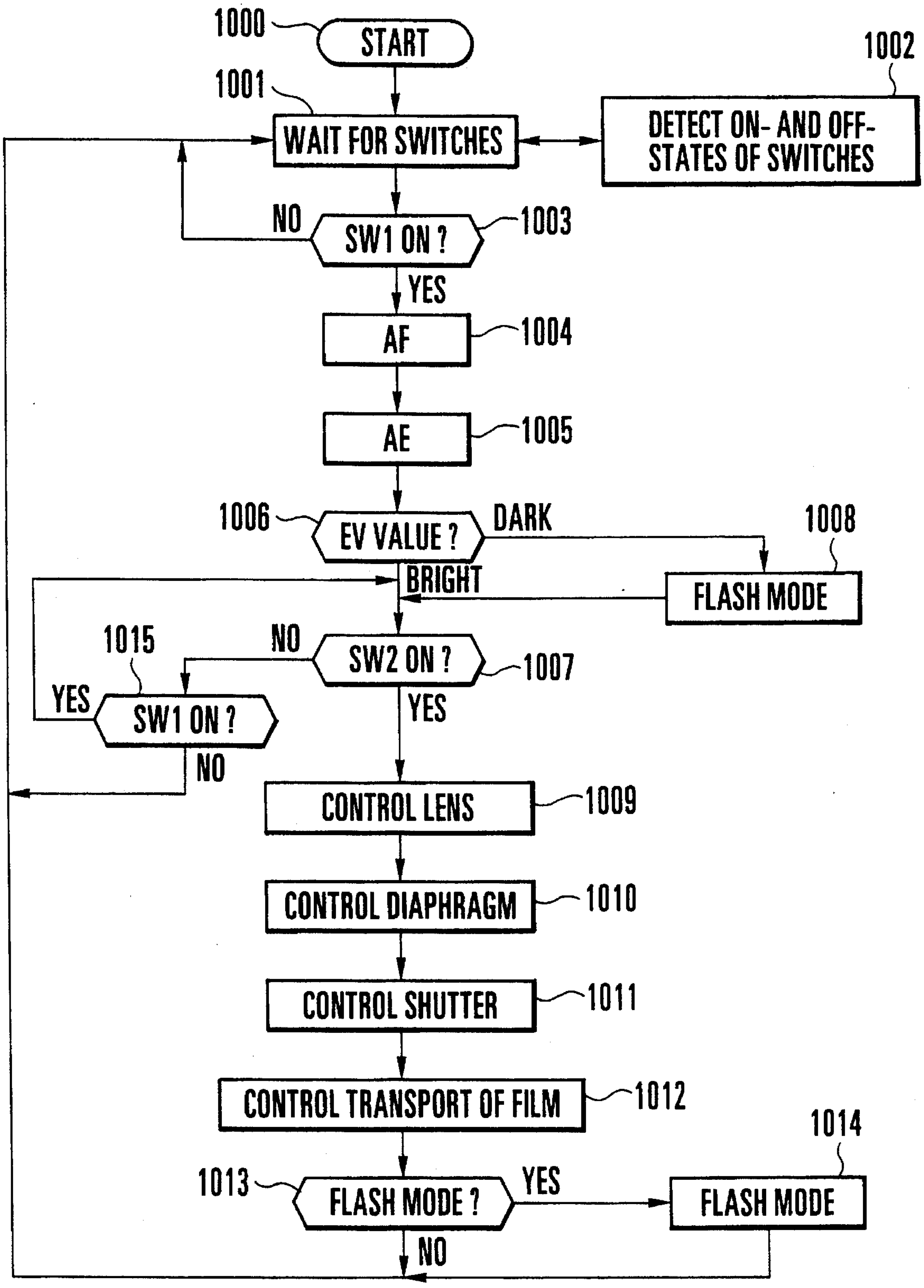
FIG. 2 is a flow chart showing a main routine of a control program of a microcomputer mounted on the camera of FIG. 1.

Referring to FIG. 2, when the power supply switch 2 is turned on at a step 1000, the microcomputer 20 becomes operative and power is supplied also to other circuits. At a step 1001, the flow of operation waits for closing of each of the switches of varied kinds to be operated for commencement of actions of the camera. At a step 1002, the state of each of various switches is detected and the flow of operation remains in the states of the steps 1001 and 1002. At a step 1003, a check is made for the state of the switch SW1 which is provided for a release action of the camera.

If the switch SW1 is found to be in an off-state by the step 1003, the flow comes back to the step 1001 to repeat the steps 1001 and 1002. When the switch SW1 is found to be in an on-state at the step 1003, the switch sensing circuit 25 sends a signal to the microcomputer 20 and the flow comes to a step 1004. At the step 1004, the AF circuit 42 is caused to perform an AF (automatic focusing) action. The AF circuit 42 then causes a distance measuring device which is not shown to measure a distance to a main object of shooting. Information on the object distance measured is inputted to the microcomputer 20.

At a step 1005, the AE circuit 43 is caused to measure the luminance of the main object. The result of light measurement thus obtained is taken in as data by the microcomputer 20. At a step 1006, a check is made to find if the light measurement data obtained by the step 1005 is brighter or darker than a predetermined value. If the data is judged to be brighter, the flow proceeds to a step 1007. At the step 1007, a check is made to find if the switch SW2 which is a main release switch has been turned on. If not, the flow comes to a step 1015 to make a check once again for the on-state of the switch SW1. If the switch SW1 is found in the on-state at the step 1015, the flow comes back to the step 1007. Then if the switch SW2 is found to be still in the off-state, the steps 1007 and 1015 are repeated. If the switch SW1 is found to be in its off-state at the step 1015, the flow comes back to the step 1001 to execute the steps all over again from the step 1001.

If the switch SW2 is found to be in its on-state at the step 1007, the flow proceeds to a step 1009. At the step 1009, a focusing control action is carried out on the main lens disposed on the side of the camera on the basis of the distance measurement data obtained by the step 1004. The flow then proceeds to a step 1010. At the step 1010, the diaphragm aperture is controlled on the basis of the light measurement data obtained by the state 1006. Further, in the case of a lens-shutter type camera which has the shutter arranged to act also as a diaphragm, the control to be executed at a next step 1011 is the same as the control of the step 1010. In that case, therefore, the step 1010 is skipped. In the case of a focal-plane shutter camera, the step 1010 is executed and then the flow comes to the step 1011 to control the shutter.

After completion of shooting, the flow comes to a step 1012 to control the transport of film to finish shooting for one frame. At a next step 1013, a check is made to find if a flash mode has been included in the flow of operation. If not, the flow comes back to the step 1001 to promptly make preparation for shooting on a next frame.

Figure 3:
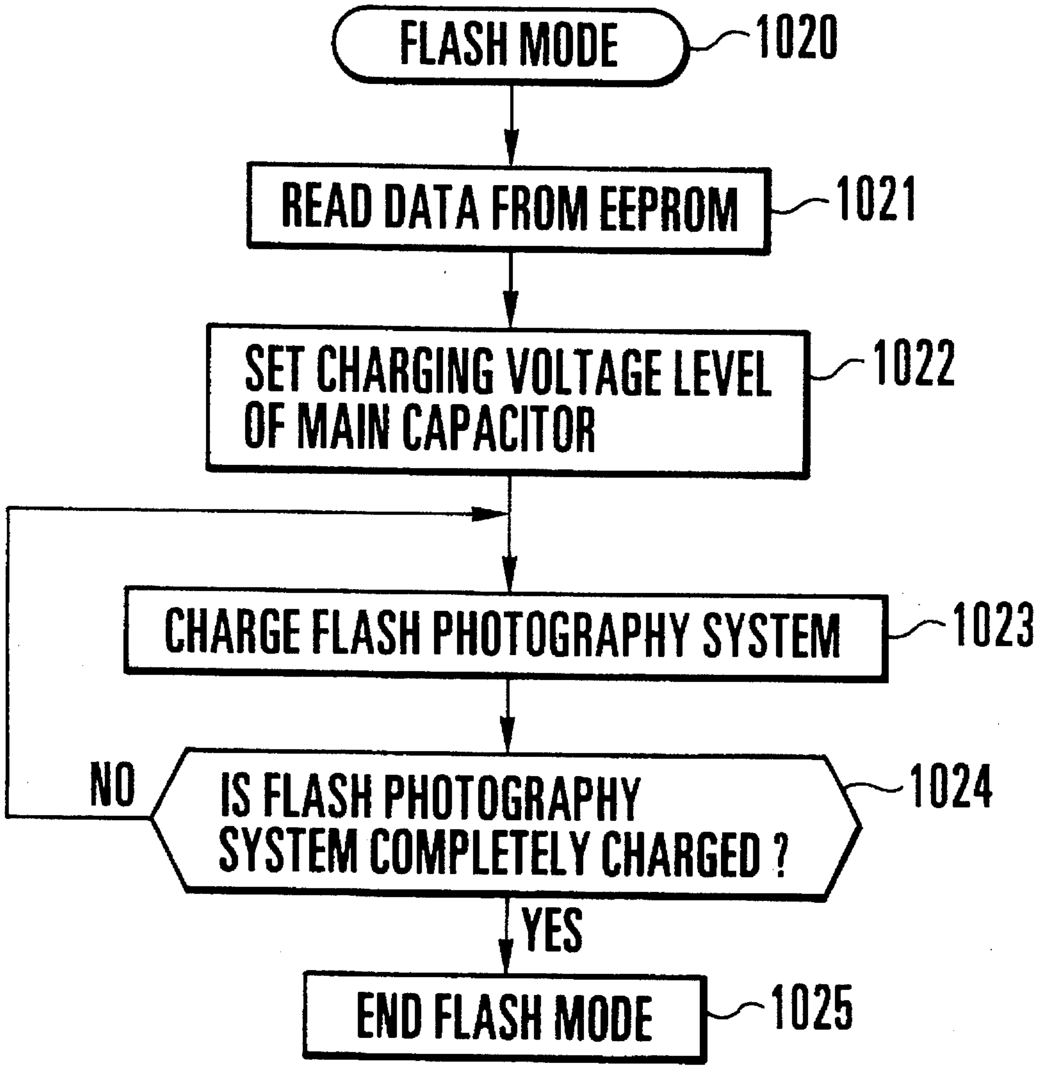
FIG. 3 is a flow chart showing a subroutine to be executed in a flash mode of the main routine of FIG. 2.

If the light measurement data obtained by the step 1005 is decided at the step 1006 to be darker than the predetermined value, the flow of operation comes to the step 1008 of the flash photography mode to execute the program of the flash photography mode shown in FIG. 3.

FIG. 3 is a flow chart showing the program of the flash photography mode as a subroutine. The control operation of the microcomputer 20 to be executed for the flash photography is described with reference to FIG. 3 as follows.

When the camera enters into the flash photography mode at the step 1008 or 1014 of FIG. 2, the subroutine commences at a step 1020 of FIG. 3. At a step 1021, data which indicates the correlation between the guide number (GNo.) of the flash device of the camera and the charging voltage of the main capacitor 6 and has been written in the EEPROM (the storage device 41 of FIG. 1) is read out from the EEPROM. At a step 1022, the data read out from the storage device 41 is compared by the multiplexer 204 with the A/D converted value of the detected value of voltage of the main capacitor 6. If the charged state of the main capacitor 6 is found to differ from (lower than) the data stored, the charging voltage for the main capacitor 6 is set on the basis of the data.

At a next step 1023, the main capacitor 6 is charged with the step-up charging control circuit 3 activated by applying a control signal to the base of the transistor 32 of the step-up charging control circuit 3 from the microcomputer 20. At a step 1024, the A/D converted value of the voltage detection value taken in from the voltage detecting circuit 5 and a check is made to find if the main capacitor 6 has been charged up to the level set by the step 1022. If so, the flow comes to a step 1025 to bring the charging action to an end. The flow then proceeds to the step 1001 or 1007 of FIG. 2. Further, the step 1014 of FIG. 2 is arranged to be also connectable to the step 1020 of FIG. 3.

Figure 4:
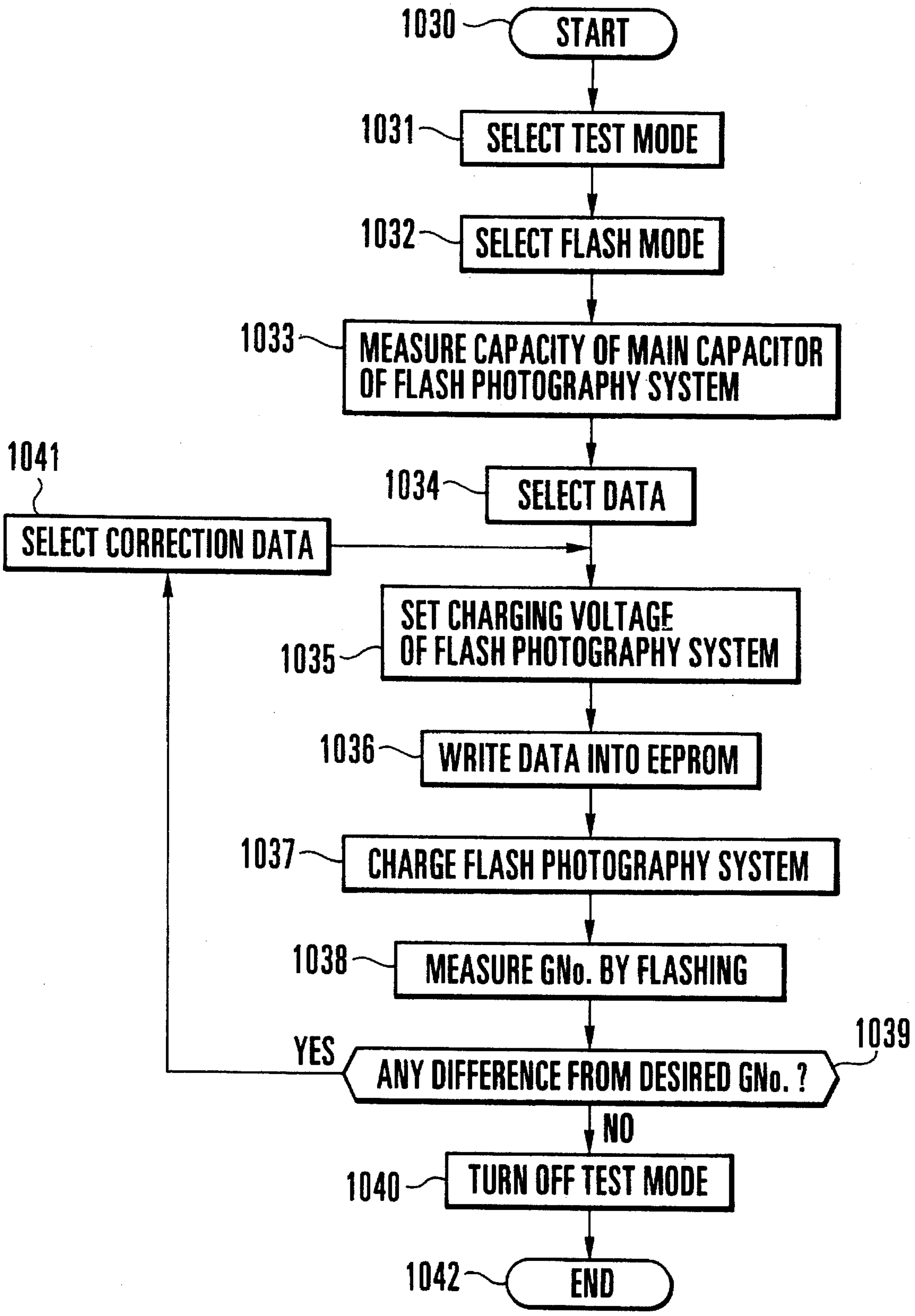
FIG. 4 is a flow chart showing the flow of control operation to be executed in storing predetermined data in a storage means included in the arrangement of the first embodiment shown in FIG. 1.

FIG. 4 shows a flow of operation to be carried out in writing the above-stated data into the storage device 41. This data writing operation is carried out at the time of shipping the camera from the factory.

The operation starts at a step 1030 of FIG. 4. At a step 1031, the microcomputer 20 is set into a test mode for the purpose of adjusting the camera. At a step 1033, the capacity of the main capacitor 6 of the camera as an individual product (applicable to data writing) is measured. At a step 1034, data is selected according to the kind of the camera to obtain an apposite guide number (GNo.). An apposite guide number is predetermined.

Figure 7:
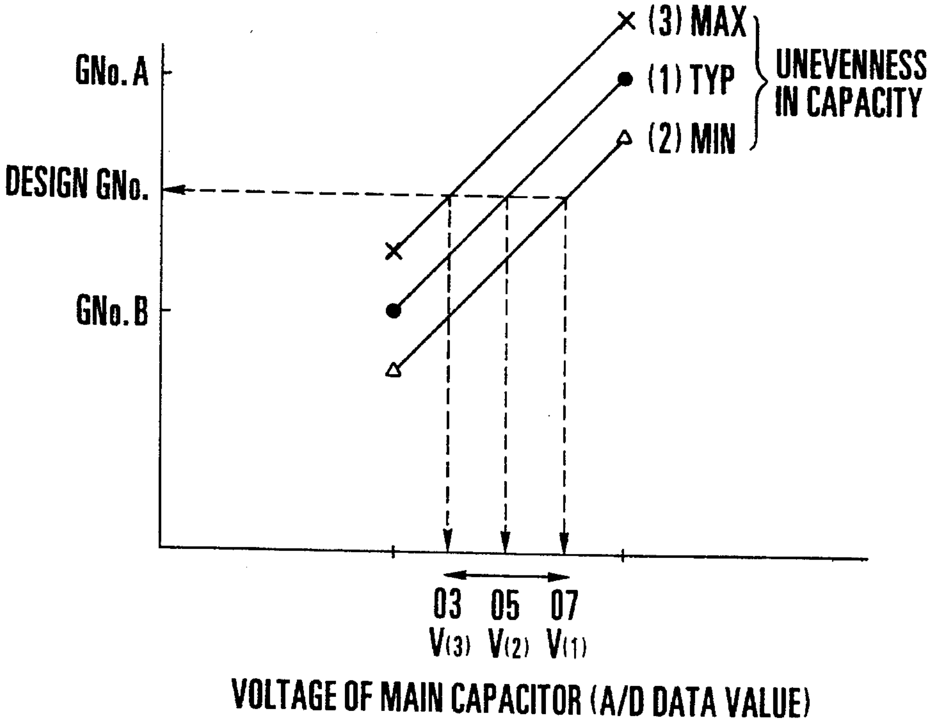
FIG. 7 shows a relation among the voltage of a main capacitor, the capacity of the main capacitor and the GNo.

At a step 1035, an A/D converted value of the charging voltage for the main capacitor 6 corresponding to the selected data (for the apposite guide number) is determined and set. At a step 1036, the data set by the steps 1034 and 1035 is written into the EEPROM 41 (in the form of an A/D converted value). At a step 1037, the main capacitor 6 is actually charged up to a charging voltage corresponding to the above-stated A/D converted value and a check is made for confirmation of conformity with the content of the EEPROM 41. At a step 1038, the GNo. is measured by causing the flash device to actually emit a flash light. A relation obtained at this time among the voltage of the main capacitor 6, the capacity of the main capacitor 6 and the GNo. is shown in a graph in FIG. 7. In FIG. 7, each of lines (1), (2) and (3) denotes a relation obtained between the main capacitor voltage and the GNo. with the capacity assumed to be inconstant due to lack of uniformity of manufacture. The abscissa shows the voltage of the main capacitor and the ordinate the varying amount of the GNo. according to the voltage. With a design GNo. assumed to be an apposite GNo. as shown in the graph, an initial setting value of voltage V(1) of the main capacitor 6 corresponds to this GNo. The initial voltage setting value V(1) is A/D converted and written into the EEPROM. An actual GNo. is measured by executing the steps 1037 and 1038 under this condition.

At a step 1039, the measured GNo. is compared with the GNo. desired for the applicable kind of the camera. If no difference is found between the two, the flow comes to a step 1040 to turn off the test mode. If there is a difference, the flow comes to a step 1041 to correct the data to be written into the EEPROM 41, and then the steps 1035 to 1039 are executed once again. The existence of the difference means that the initial voltage setting value is caused to vary in GNo. by the variations represented by lines (1), (2) and (3) as shown in FIG. 7. The difference causes such inconvenience that the GNo. of one individual camera differs from that of another. To adjust this, the voltage of the main capacitor 6 is corrected to change the initial voltage setting value V(1) to a voltage value V(2) or to a voltage value V(3) and an A/D converted value corresponding to the voltage value V(1), V(2) or V(3) is again written into the EEPROM 41, and the GNo. is measured once again. The flow of operation comes to an end at a step 1042 and the data writing process comes to an end.

Further, the process of measuring the GNo. at the step 1038 can be executed, for example, by setting a sensor at a position located at a predetermined distance away from the flash device, causing the flash device to flash under such condition and finding the GNo. according to a quantity of light received by the sensor. At the step 1039, the charging voltage is set according to the difference between the design GNo. and the measured GNo. in such a digital value at which the charging voltage can be changed from the voltage V(1) to the above-stated voltage V(2) or V(3). A program of a tool, etc., may be composed in such a way as to automatically carry out the steps 1039 and 1041. Otherwise, it is also possible to have the digital value manually selected and set with the difference between the measured GNo. value and the design GNo. value determined by a worker at the factory.

Figure 5:
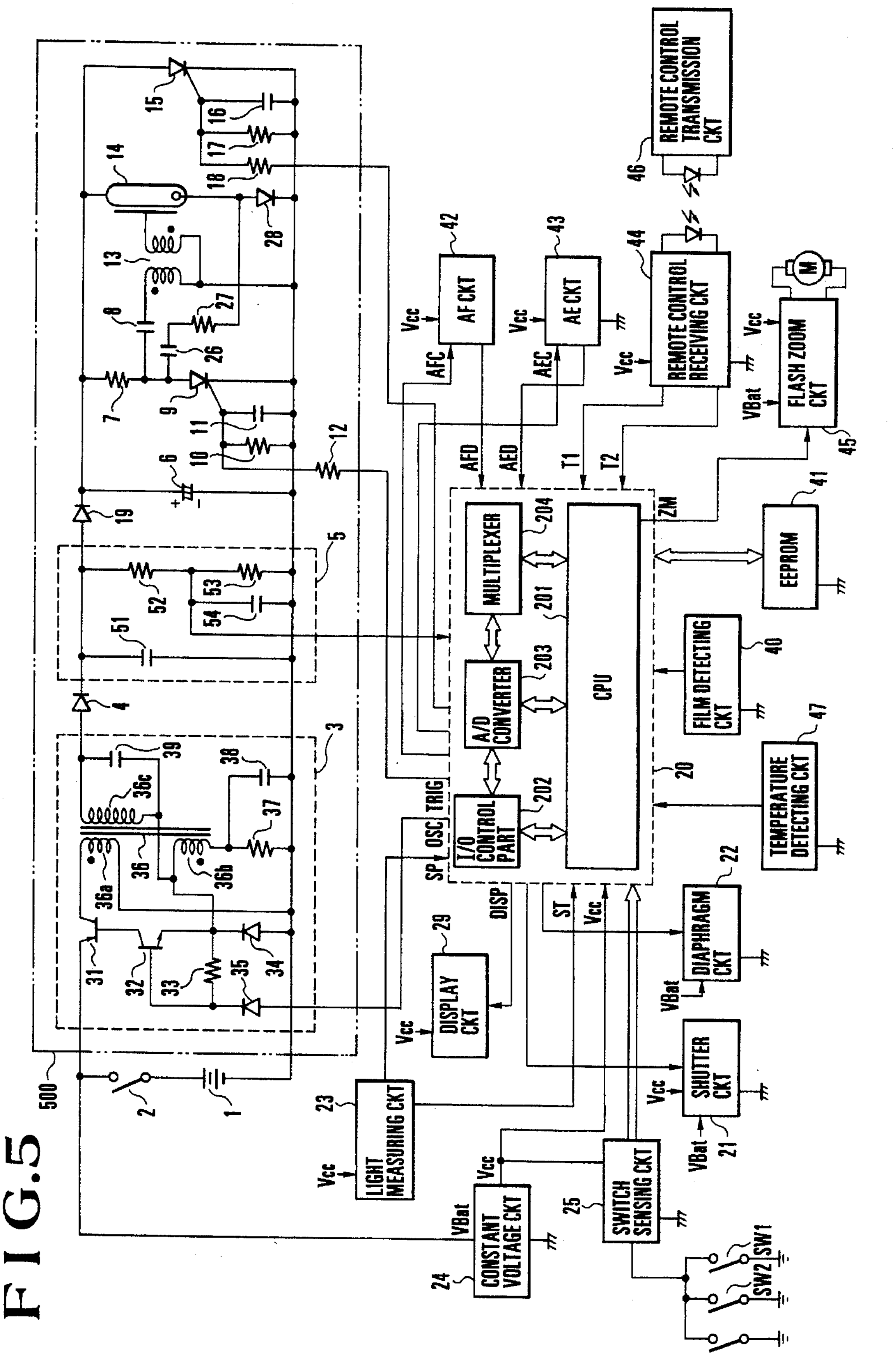
FIG. 5 schematically shows the electrical arrangement of a camera having a flash photography system arranged as a second embodiment of the invention.

A flash photography system of a camera which is arranged as a second embodiment of the invention is next described with reference to FIGS. 5 and 6. The flash photography system of the second embodiment differs from that of the first embodiment only in that a temperature detecting circuit 47 is added to the arrangement of the first embodiment. Therefore, other component elements of the second embodiment are omitted from description.

Figures 9, 10:
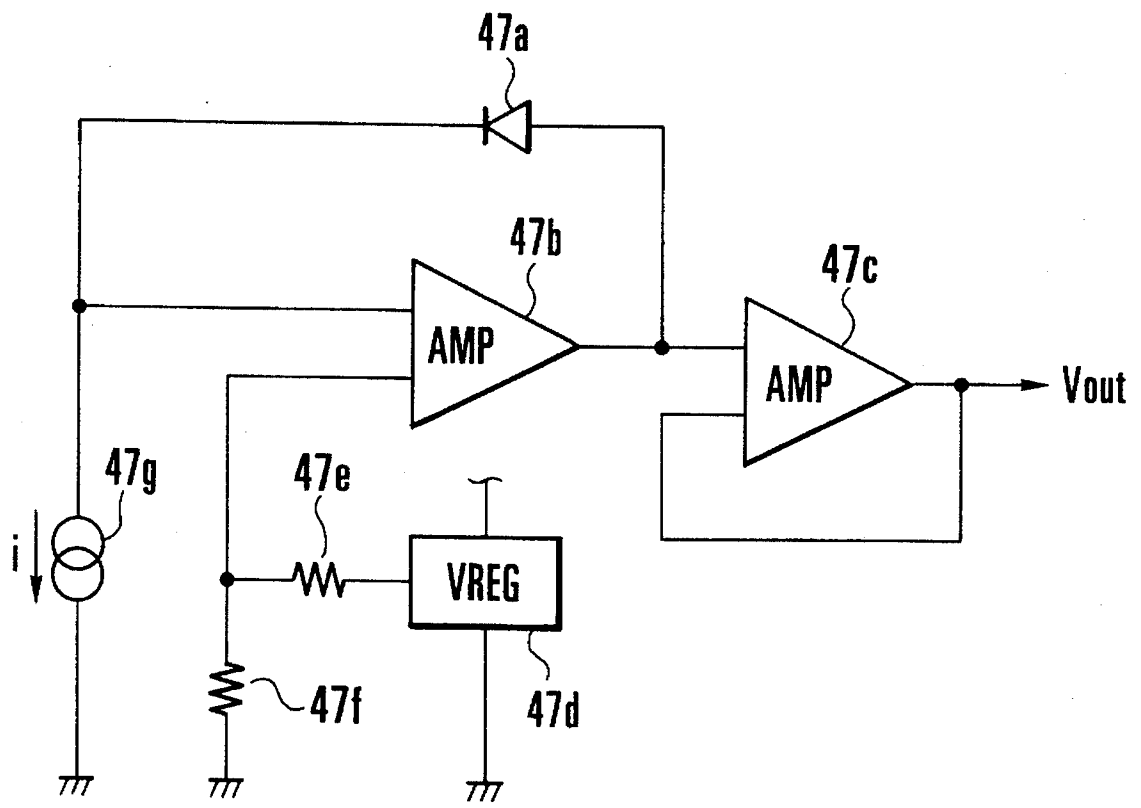
FIG. 9 schematically shows the electrical arrangement of a temperature detecting circuit which is included in the second embodiment of the invention.
FIG. 10 shows by way of example data to be written at a temperature setting address of an EEPROM.

The temperature detecting circuit 47 is first described as follows. FIG. 9 shows the electric arrangement of the temperature detecting circuit 47 included in the second embodiment. Referring to FIG. 9, the electric arrangement includes a reverse-current preventing diode **47*a*, amplifiers 47*b* and 47*c*, a regulator 47*d* which is a constant voltage source, dividing resistors 47*e* and 47*f* for generating a reference voltage, and a constant current source 47*g***.

The output of the amplifier **47*b* can be expressed as follows, with the values of the dividing resistors 47*e* and 47*f* for generating a reference voltage assumed to be R5 and R6 and the forward voltage of the diode 47*a*** to be VF:

a reference voltage=the output voltage of the regulator **47*d***×(R5 / R6)

the output of amplifier **47*b*=the reference voltage+a forward voltage VF of the diode 47*a***

The output of the amplifier **47*b* is amplified by the amplifier 47*c* to have a voltage Vout outputted. In this case, the diode 47*a* has such a characteristic that the forward voltage VF varies with temperature. The voltage outputted from the amplifier 47*b* also varies when the forward voltage VF of the diode 47*a*** varies. The state of temperature is detected by A/D converting the value of this voltage.

The main routine of the control operation of the microcomputer 20 is the same as in the case of the first embodiment. The following description is, therefore, limited to a subroutine which is a control operation to be performed at the time of flash photography.

Figure 6:
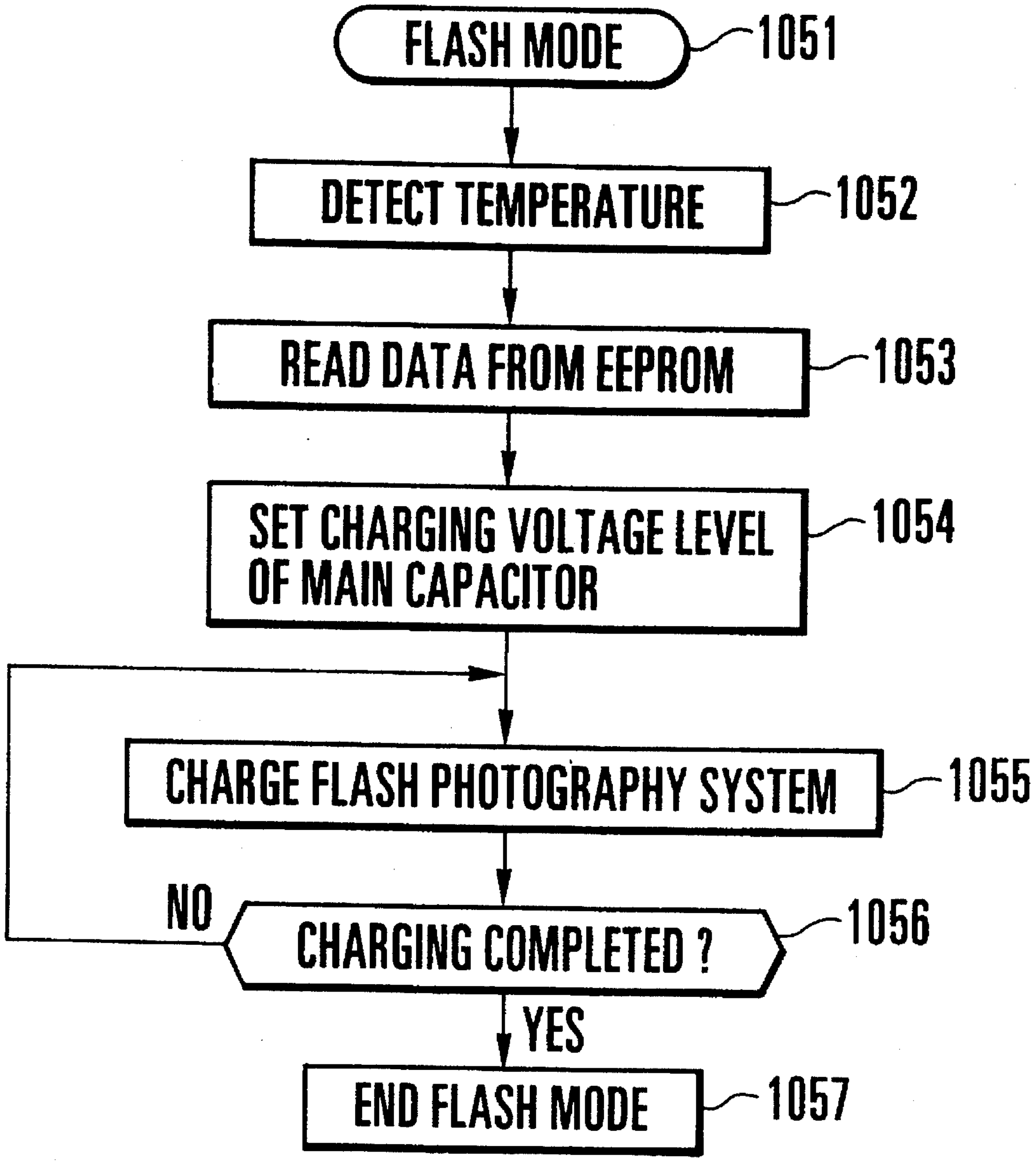
FIG. 6 is a flow chart showing a flow of control operation to be executed when the camera shown in FIG. 5 is in a flash mode.

When the flow of operation enters into the flash photography mode at the step 1008 or 1014 of FIG. 2, the microcomputer 20 begins to carry out a program from a step 1051 of FIG. 6. At a step 1052, the output of the temperature detecting circuit 47 is taken in. At the same time, a detected value of the voltage of the main capacitor 6 is taken in and is A/D converted. The flow of operation proceeds to a step 1053 to read out, from the data storage device 41, charging voltage data which has been written in the data storage device 41 with a detected temperature value used as an address. At a step 1054, a charging voltage is set for the main capacitor 6 on the basis of the data read out by the step 1053. At a step 1055, a driving signal is applied to the transistor 32 of the step-up charging control circuit 3. The step-up charging control circuit 3 is actuated to perform a charging action on the main capacitor 6. At a step 1056, the charged level of the main capacitor 6 is monitored by taking in a detected voltage value of the main capacitor 6 from the voltage detecting circuit 5. When the main capacitor 6 is found to have been charged up to a set level, the driving signal is stopped from being applied to the transistor 32. Then, at a step 1007, the process of charging comes to an end, and the flow of operation comes back to the step 1007 of FIG. 2 to be ready for flashing (for commencement of flash photography).

Figure 8:
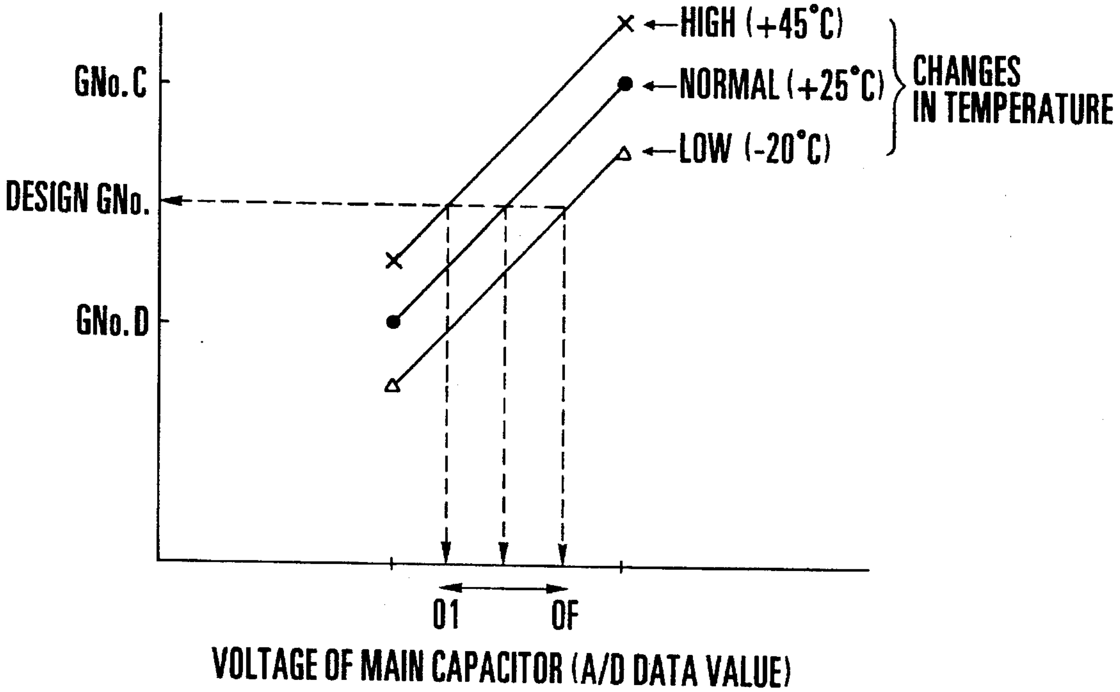
FIG. 8 shows a relation among the capacity of a main capacitor which varies with temperature, the voltage of the main capacitor and the GNo.

The data to be written into the EEPROM at its temperature setting address, in performing the operation described above, is shown in FIG. 10. If the capacity of the main capacitor 6 is (1) while the temperature is +25° C., for example, the voltage address value for +25° C. is adjusted to "05H" as charging voltage data corresponding to a design GNo., as shown in FIG. 10. In this instance, the capacity of the main capacitor 6 decreases and the GNo. also decreases accordingly as the temperature is lower even in the case of the capacity (1). To prevent this, the energy is retained at a constant level to keep the GNo. unvarying by raising the voltage of the main capacitor. The values of voltage setting data to be used in this instance are arranged in one row as represented by the row of the part (1) of FIG. 10. The main capacitor charging voltage data is set according to the data of the temperature detecting means and is transmitted to the CPU. For example, with data from the temperature detecting means considered to indicate −10° C., the data is set as "OBH" and a main capacitor charging voltage corresponding to the "OBH" is set. FIG. 8 shows this in a graph. Values obtained by A/D converting the voltage values of the main capacitor 6 are shown on the abscissa of the graph. The main capacitor 6 is charged up to a point where the GNo. becomes constant as shown on the ordinate of the graph.

The data for temperature which corresponds to the capacity of the capacitor is written beforehand into the EEPROM, and data is set appositely to the temperature.

In accordance with the invention, the GNo. of the flash light of the flash device can be made constant and unvarying by virtue of the operation described above without being affected by changes in temperature. The accuracy of the operation can be enhanced by finely arranging the resolution of the A/D conversion.

What is claimed is:

1. A charging control device for a flash device, comprising:

a) temperature detecting means for detecting a temperature condition; and b) charging regulating means for regulating a charging action on a main capacitor of the flash device on the basis of the temperature condition detected by said temperature detecting means, said charging regulating means including memory means for storing charging action data corresponding to diverse temperatures.

2. A device according to claim 1, wherein said charging regulating means is arranged to control a charging voltage for the main capacitor of the flash device to obtain a voltage corresponding to the charging action data stored in said memory means.

3. A device according to claim 2, wherein said stored charging action data corresponds to a plurality of different charging voltages, said charging regulating means further including reading means for reading out from said memory means, stored charging action data corresponding to the temperature condition detected, and controls the charging voltage for the main capacitor on the basis of the data read out by said reading means.

4. A charging control device for a flash device of a camera, comprising:

a) detecting means for detecting a charging voltage for a main capacitor of the flash device;

b) a writable and erasable memory circuit in which data corresponding to a charging voltage related to a guide number for the camera is written;

c) an A/D conversion circuit for converting the charging voltage detected by said detecting means into a digital value; and d) a charging circuit for making a comparison between the digital value obtained by said A/D conversion circuit and the data read out from said memory circuit and stopping a charging action performed on the main capacitor when the comparison provides a predetermined result.

5. A method for setting a charging voltage for a flash device, comprising:

a) a step of setting, in a memory, charging data corresponding to a reference guide number;

b) a step of causing the flash device to perform flash emission in a state of having a main capacitor of the flash device to perform flash emission charged up to a charging voltage corresponding to the charging data;

c) a step of measuring a guide number which is obtained by the flash emission; and d) a step of writing new charging data in said memory according to a difference between the measured guide number and the reference guide number.

* * * * *